United States Patent [19]

Wei

[11] 3,903,198

[45] Sept. 2, 1975

[54] PROCESSING AID FOR POLYVINYL CHLORIDE

[75] Inventor: Chung Hwei Wei, Wilmington, Del.

[73] Assignee: Stauffer Chemical Company, Westport, Conn.

[22] Filed: Feb. 20, 1974

[21] Appl. No.: 444,201

[52] U.S. Cl. ..... 260/876 R; 260/17.4 R; 260/23 EP; 260/23 XA; 260/28.5 D; 260/45.7 P; 260/45.7 S; 260/45.75 R; 260/45.75 K; 260/45.8 NZ; 260/45.85 R; 260/836; 260/878 R; 260/884; 260/885

[51] Int. Cl.² .................... C08F 15/00; C08F 19/00

[58] Field of Search ......................... 260/876 R, 884

[56] References Cited

UNITED STATES PATENTS

| | | | |
|---|---|---|---|
| 3,504,053 | 3/1970 | Williams | 260/884 |
| 3,562,235 | 2/1971 | Ryan | 260/876 R |
| 3,764,638 | 10/1973 | Hwa | 260/876 R |

*Primary Examiner*—Paul Lieberman

[57] ABSTRACT

A process is disclosed for preparing a polyacrylate-modified polyvinyl chloride processing aid for polyvinyl chloride by sequentially polymerizing the vinyl chloride and the desired acrylate ester monomer. Thus, a conventional vinyl chloride suspension polymerization is conducted and at about 60–80 percent of its completion a minor proportion of a methyl methacrylate-ethyl acrylate mixture is added and polymerization is resumed so that the mixture forms a copolymer with residual vinyl chloride monomer. An additional minor portion of methyl methacrylate-ethyl acrylate is then added to graft polymerize onto the copolymer. The polyacrylate-modified PVC thereby recovered is an effective aid for processing conventional PVC, or it can be processed per se since it is suitable for calendering or extruding.

19 Claims, No Drawings

PROCESSING AID FOR POLYVINYL CHLORIDE

BACKGROUND OF THE INVENTION

When converting PVC, i.e., polyvinyl chloride, the resin ordinarily undergoes a fluxing step after which it is processed to its desired shape. It is, of course, necessary that the resin remain stable at the high temperatures which are encountered during these processing and fluxing procedures. Additionally, the resin must yield under stress, it must have adequate flow properties and it must lend itself to milling and extrusion. Since unmodified PVC does not always possess all of these properties, it has been necessary or desirable to add various processing aids to the resin. For instance, acrylic ester polymers in granular form are dry-mixed with the PVC resin and are then milled on a calender or are extruded. Alternatively, it is suggested by British Pat. Nos. 1,062,308 and 1,015,334 that the vinyl chloride may be polymerized in the presence of the preformed acrylic ester polymer or the acrylic ester monomer may be added to the polyvinyl chloride latex and polymerized in situ. The resulting product is an emulsion grade polyvinyl chloride blended with the polyacrylate ester modifier. Such modified polymers and processing aids permit faster calendering with improved gloss, better surface qualities on extrusion, freedom from plating and other benefits.

In U.S. application Ser. No. 760,067 there is disclosed a process for preparing processing aids for PVC by means of a process involving initiating the suspension polymerization of PVC, removing unreacted vinyl chloride monomer from the system after polymerization is at least 60 percent complete, introducing methyl methacrylate (MMA) monomer into the system whereupon the polymerization is resumed and continued until the methyl methacrylate is polymerized.

However, since filing the latter patent application, it has been found that the products resulting from the polymerization process disclosed therein are somewhat deficient with respect to their melt flow properties, i.e., their fluidity characteristics, during subsequent processing operations such as molding.

Still another significant deficiency of the process disclosed in the above identified application is the absence of any means of controlling the size of the initially prepared PVC particles as well as of the particles of the polyacrylate modified PVC derived therefrom. There was, moreover, no recognition given to the necessity for producing the desired processing aid in a certain particle size range. For example, if the processing aid particles are too large in size, their use in certain applications, such as for example as in bottle blowing, will result in the preparation of products having a grain-like surface or so-called "applesauce" effect.

Thus, it is the prime object of this invention to provide an improved method for preparing a polyacrylate-modified PVC processing aid. Still another object involves providing an efficient means for controlling both the size of the PVC particles prior to their modification with the subsequently added MMA, as well as the size of the polyacrylate-modified PVC particles derived therefrom. It is a further object to obtain these polyacrylate-modified PVC processing aids by means of a process which is at all times fully reproducible with respect to the properties inherent in the products derived therefrom. Various other objects and advantages of this invention will be apparent upon reading the disclosure which follows hereinafter.

TECHNICAL DISCLOSURE OF THE INVENTION

These and other objects are achieved by the process of this invention which comprises suspension polymerizing vinyl chloride monomer (VCM) under conditions whereby polyvinyl chloride is obtained by means of a conventional, free radical initiated, suspension polymerization at a controlled rate of agitation and in the presence of a suspending agent; adding to the system an effective concentration of a chain transfer agent and a minor propertion, i.e., about 4–6 parts per hundred (VCM charged as 100 parts) of a methyl methacrylate-ethyl acrylate mixture which may comprise up to about 25 percent by its weight of one or more optional comonomers, as hereinafter defined, to copolymerize with residual VCM to form a copolymer and thereafter graft polymerizing a similar methyl methacrylate-ethyl acrylate mixture, e.g., added in about 40–50 parts per hundred, to the compolymer, and, separating the polyacrylate-modified polyvinyl chloride thereby obtained. The thus formed copolymer and the graft polymer formed thereon produces a polyacrylate-modified PVC resin which acts as an effective processing aid to improve the band time (see Example 2). The process aid can be blended with a polyvinyl chloride resin substrate or can be processed per se without the addition of any other processing aid.

By controlling the rate of agitation and the concentration of the suspending agent that is present in the system during the initial polymerization of the PVC as well as during the subsequent polymerizations, it is possible to readily control the size of the initially produced PVC particles, thereby greatly facilitating polymerization of the subsequently introduced acrylate mixture. In the same manner, the size of the resulting polyacrylate-modified polyvinyl chloride particles is now readily maintained within the required limits so as to avoid producing them in too large a particle size thereby preventing "gel" or "fish-eye" or "grain-like" surface characteristics in the final PVC composition wherein these processing aid particles have been included.

According to the preferred embodiment of this invention, the acrylate mixture of methyl methacrylate and ethyl acrylate and any optional monomers, e.g., methyl acrylate, butyl acrylate and 2-ethylhexyl acrylate, is introduced into the system in the first polymerization containing residual VCM in a concentration of from about 4–6 parts per hundred with the amount of charged VCM representing 100 parts. The amount of acrylate mixture added during the subsequent graft polymerization ranges from 40–50 parts per hundred, preferably 45 pph. The amount of acrylate in the acrylate-modified polyvinyl chloride processing aid product will be approximtely 30–40 percent, preferably 35 percent, while the polyvinyl chloride comprises from about 60 to 70 percent, preferably about 65 percent, by weight, of the total weight of the product. The methyl methacrylate-ethyl acrylate mixture contains from 4:1 to 6:1 methyl methacrylate:ethyl acrylate by weight, preferably 5:1.

The acrylate mixture which is utilized in the present invention can contain up to 10 percent by weight of one or more ethylenically unsaturated, i.e., vinyl, comonomers which are copolymerizable with the acrylate mixture.

The vinyl comonomers which can be used in the mixture may be selected from the group consisting of the $C_3$ alkyl methacrylates, e.g., n-propyl and isopropyl methacrylate; the glycidyl esters of acrylic and methacrylic acid, e.g., glycidyl methacrylate and glycidyl acrylate; and, preferably, the $C_1$ and $C_{12}$ alkyl acrylates wherein the alkyl group may be straight or branched, e.g., methyl, n-propyl, n-butyl, isobutyl, tert-butyl, hexyl, 2-ethylhexyl, decyl and dodecyl acrylate; or, mixtures of any two or more of the latter optional monomers.

It has been found that by adding the polyacrylate-modified polyvinyl chloride processing aids thus obtained to polyvinyl chloride resins containing a major proportion; i.e., above about 90% polyvinyl chloride either alone or in combination with suitable copolymers, as will be described below, in a concentration of from about 1–10 percent, by weight of the total mixture, the resultant compositions are easier to process than unmodified polyvinyl chloride.

The process of this invention comprises the step of adding the appropriate amount of an acrylate ester monomer mixture, comprising methyl methacrylate and ethyl acrylate with or without one or more optional comonomers, to a previously polymerized, aqueous suspension of polyvinyl chloride, particularly PVC obtained by means of a suspension polymerization process when the conversion to PVC is in the range of 60–80 percent. In conducting such a suspension polymerization process for the preparation of PVC, the vinyl chloride monomer, or a mixture of vinyl chloride with a minor proportion of an appropriate comonomer, such as vinyl acetate or vinylidene chloride is admixed with a concentration of from about 0.01 to 5.0 percent, as based on the weight of the total monomer mixture, of a suspending agent such, for example, as methyl cellulose, hydroxyethyl cellulose, hydroxypropyl cellulose, carboxymethyl cellulose, talc, clay, polyvinyl alcohol, gelatine, and the like. As has already been noted, the particle size of the resulting PVC particles has been found to be affected by the concentration of the suspending agent that is present in the system. Thus, it is important to utilize a concentration of the selected suspending agent which is within the above stated limits. For example, if the latter maximum limit for the concentration of the suspending agent is substantially exceeded, the resulting PVC particles will be well below the desired particle size range which, as will be further discussed hereinbelow, is in the range of from about 5 to 150 microns. Conversely, if the lower limit of this range is not met, the resulting PVC particle will be too large.

In addition, a monomer soluble, free radical catalyst or initiator such, for example as 2,2'-azobisisobutyronitrile, lauroyl peroxide, benzoyl peroxide or isopropyl peroxydicarbonate should be present in the system in a concentration of from about 0.01 to 3 percent, by weight, of the total monomer charge being utilized for the polymerization of the PVC or vinyl chloride copolymer.

Polymerization may then be initiated by heating the above described recipe at a temperature in the range of from about 20° to 90°C., and for a period of from about 3 to 15 hours with agitation being applied throughout the course of the reaction. As was discussed hereinabove with respect to the concentration of the suspending agent, the rate at which agitation is applied during the polymerization of the PVC is still another significant process variable which affects the particle size of the resulting PVC particles. Thus, if insufficient agitation is applied, the PVC particles will be far too large.

As will be understood by those skilled in the art, the substantial number of variations in the size and configuration of the agitation apparatus and reaction vessel which can be utilized in polymerization processes makes it impossible to set forth a range for the rate of agitation that is required to be applied in conducting the polymerization of PVC as the first step in the process of this invention. Accordingly, the agitation rate to be applied under any specific reaction conditions will be largely dependent upon such factors as the concentration of the suspending agent that is present in the system as well as on the design of the particular agitator, e.g., the shape of its blades, and reaction vessel, e.g., the number and design of its baffles, which are being utilized. Thus, the skill of the practitioner in the art will readily enable him to make whatever adjustments may be necessary in order to prepare the resulting PVC particles so that they are all substantially within the above given particle size range of from about 5 to 150 microns, and preferably, from about 25 to 80 microns.

Similarly, as has already been noted, it is desirable that the particle size of the final product, i.e., of the polyacrylate-modified polyvinyl chloride processing aid, be within certain limits. Thus, it is preferred that they should range in size from a minimum of about 10 microns up to a maximum limit such that no more than about 15%, by weight, are larger than about 150 microns. A preferred range is from about 40 to 150 microns. Thus, if the particles of the processing aid are substantially smaller than the latter minimum size, it will be extremely difficult to isolate them with conventional plant equipment. Conversely, if the maximum limit for the size of these processing aid particles is substantially exceeded, "gels", "fish-eyes", and the above described "applesauce" effect will be imparted to the processed PVC compositions containing such oversized processing aid particles.

Polymerization of the added acrylate ester monomer mixture is initiated by a standard monomer soluble, i.e., oil-soluble, free radical initiating catalyst. Suitable catalysts include, 2,2'-azobisisobutyronitrile, lauroyl peroxide, benzoyl peroxide, t-butyl peroxy pivolate and isopropylperoxy dicarbonate.

No chain transfer agent is required. If a chain transfer agent is used in the acrylate, the final product loses its desired processability properties.

The polymerization of the acrylate ester monomer mixture, i.e., of the MMA/EA and of any optional comonomers which may have been introduced into the system therewith, is conducted by heating the system at a temperature of from about 40° to 100°C. for a time sufficient to completely polymerize the acrylate mixture to residual VCM after the first addition of acrylate mixture to form an intermediate copolymer and to graft polymerize the second addition of acrylate mixture to the copolymer. It is to be pointed out that it is not ordinarily necessary to introduce any fresh suspending agent into the system since a sufficient quantity will already be present from the initial polymerization of the PVC.

The particular catalyst, temperature, reaction time and other operating conditions chosen are, of course, interdependent and may be those ordinarily employed in the polymerization of acrylate elastomers. Other variations in polymerization technique will suggest themselves to those skilled in the art.

The process of this invention is particularly satisfactory when conducted with polyvinyl chloride homopolymer as the initially prepared vinyl chloride host polymer. However, as has already been briefly noted, there can also be employed the usual copolymers of vinyl chloride with minor proportions, i.e., up to about 20 percent by weight, of one or more ethylenically unsaturated, e.g., vinyl, comonomers provided that the resulting vinyl chloride copolymers within the above specified particle size range and has a relative viscosity, as determined in a 1 percent by weight solution of polymer in cyclohexanone at 25°C., of from about 1.5–2.8, preferably 1.9–2.5. Similarly, the processing aids obtained by this process are especially desirable for incorporation in a substrate which may be polyvinyl chloride or a copolymer of vinyl chloride with one or more ethylenically unsaturated comonomers. Thus, for example, they provide excellent results with vinyl chloride:-vinyl acetate copolymer.

Illustrative of these vinyl comonomers which can be used in preparing either the vinyl chloride host polymer of the novel processing aid of this invention or the vinyl chloride polymer substrates with which these processing aids may subsequently be blended included vinyl and the following comonomers: alpha-olefins such as ethylene, propylene and butylene; vinyl esters of carboxylic acids such as vinyl acetate, vinyl propionate, vinyl butyrate, and vinyl sterate; $C_1$–$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro-substituted benzyl esters of acrylic and methacrylic acid such as benzyl acrylate and 2-chlorobenzyl acrylate; ethylenically unsaturated monocarboxylic acids such as acrylic and methacrylic acids; their anhydrides and their $c_1$–$C_{20}$ mono- and dialkyl esters such a aconitic acid, fumaric acid, maleic acid, itaconic acid, citraconic acid, maleic anhydride, dibutyl fumarate and mono-diethyl maleate; amides of ethylenically unsaturated carboxylic acids such as acrylamide and methacrylamide; vinyl aryl compounds such as styrene and alpha-methyl styrene; nitriles of ethylenically unsaturated carboxylic acids such as acrylonitrile and methacrylonitrile; vinyl pyrrolidones such as N-vinyl-2-pyrrolidone; $C_1$–$C_{20}$ alkyl vinyl ethers such as methyl vinyl ether, ethyl vinyl ether and stearyl vinyl ether; dienes such as isoprene and butadiene; and, glycidyl esters of acrylic and methacrylic acid such as glycidyl acrylate and glycidyl methacrylate, etc.

It is essential, in this process, that the PVC, or vinyl chloride copolymer, be first polymerized until the reaction is at least 60 percent complete and less than 80 percent complete. At this point the acrylate monomer mixture is added and polymerizes with residual VCM. After the resulting intermediate copolymer has been formed, additional acrylate monomer mixture is added to graft polymerize with the copolymer that has been previously formed. This feature of sequential polymerization, i.e., of first forming the intermediate copolymer and the subsequent graft polymer is the unique and important aspect of this invention.

The two polymerizations utilizing the acrylate monomer mixture with or without one or more optional monomers, should be carried out in the same vessel that is used for the initial vinyl chloride suspension polymerization. If the acrylate ester monomer polymerization is carried out in situ it may not be necessary to add any additional catalyst.

The compositions resulting from the admixture of PVC, or of a vinyl chloride copolymer substrate, with the polyacrylate-modified polyvinyl chloride processing aids of this invention can also include various optional additives or adjuncts which may include, for example:

Plasticizers such as the alkyl esters of phthalic, adipic and sebacic acids and aryl phosphate esters such, for example, as dioxtyl phthalate, ditridecyl phthalate and tricresyl phosphate, etc.

Lubricants such as stearic acid and its barium, calcium and lead salts, petroleum or paraffin based waxes, oils, low molecular weight polyethylene waxes, stearamides, montan wax, modified montan wax, synthetic waxes and stearic acid esters such as glyceryl monosterarate, etc.

Pigments such as calcium carbonates, titanium dioxide, whiting, carbon black or any of the other pigments normally used in the processing of plastics.

Stabilizers which will protect the final formed product from the degradative effects of heat and light and which include phenyl salicylates; benzophenones; benzotriazoles; basic lead compounds such as dibasic lead phosphate, dibasic lead stearate, lead sulfate, lead chlorosilicate and dibasic lead phthalate; organo tin compounds such as dibutyl tin maleate, dibutyltin dilaurate, di(n-octyl) tin maleate polymer, n-butyl stannoic acid, thiolauric acids or its anhydride, dibutyltin lauryl mercaptide, dibutyltin isooctyl thioglycolate, dibutyltin mercaptopropionate and di(n-octyl)tin S,S'-bis(isooctylmercaptoacetate); organic acid salts of barium, cadmium, calcium or zinc such as barium 2-ethylhexoate, barium nonylphenate, cadmium 2-ethylhexoate, zinc 2-ethylhexoate and the laurates and stearates of barium, cadmium, calcium or zinc; polyols such as pentaerythritol and sorbital; nitrogen compounds such as melamine, benzoguanamine and dicyandiamide; epoxies such as epoxidized soya oil, epoxidized linseed oil, epoxidized tall oil esters and butyl and octyl epoxy stearate; organic phosphites such as diphenyldecyl phosphite, phenyl didecyl phosphite and tris-nonylphenyl phosphite; and, liquid phenolics such as butylated hydroxytoluene, etc. For a more complete listing of plasticizers, lubricants, stabilizers and other functional additives, one may consult "Polyvinyl Chloride" by H. A. Sarvetnick, published by VanNostrand Reinhold Co., New York, New York in 1969.

The compositions resulting from the admixture of PVC, or of a vinyl copolymer with the polyacrylate-modified PVC processing aids of this invention may be utilized in any of the coating, impregnating and molding applications known to those skilled in the art. For example, these compositions may be used for preparing such diverse items as pipes, rods, tubes, siding, molded and extruded solids, profiles, calendered foams, blow moded bottles and other containers, extruded flat bed and blown films and in carrying out such processes as extrusion, calendering, compression molding, blow molding, injection molding, fluidized bed coating, electrostatic powder spraying and rotational casting or molding, etc.

The following examples are given to illustrate this invention but not in any way to limit its scope. In these examples, all parts given are by weight unless otherwise noted.

EXAMPLE 1

Two thousand four hundred gallons of deionized water and 300 gallons of Methocel K-35 suspending agent were agitated for at least 15 minutes. The water temperature was brought to 70°C, 2,2'-azo-bis-isobutyronitrile initiator (9.75 lbs.) was charged into the reactor, and the reactor was purged with vinyl chloride monomer (VCM) and 7750 pounds of VCM was added. The polymerization temperature was set at 70°C., a 40 lb. pressure drop was impressed upon the reaction mixture and 390 lbs. of a methyl methacrylate/ethyl acrylate monomer (MMA/EA) premix (5:1 weight rates of acrylates in the mixture) was added. The polymerization was allowed to run for about 10 hours until a 100 psig batch pressure was reached. The reactor was degassed and stripped to full vacuum. It was held in this condition for 20 minutes and was cooled to 60°C. The agitator was turned to slow speed, the vacuum was broken, and the manway was opened.

After the dome and walls were spray rinsed, an additional six pounds of 2,2'-azo-bis-isobutyronitrile and 3490 pounds of the MMA/EA premix were charged into the reactor. The reactor was put onto full vacuum and held for 5 minutes. Fast agitation was used and the polymerization temperature was set at 75°C. After 2 hours the reaction temperature was terminated by degassing. The full vacuum was pulled, and the reactor was held for 35 minutes at 75°C. The batch was allowed to cool.

EXAMPLE 2

This example shows a rigid film processability test using a laboratory 2-roll mill having a mill gap set at 10 mills ± 2 mills, a mill temperature of 350°F. (front roll) and 345°F. (rear roll) and a mill speed (at both rolls) of 20 rpm.

The compounding formula that was tested had the following formulation:

| COMPONENT | AMOUNT |
| --- | --- |
| Polyvinyl chloride resin (Rel. Viscosity = 2.05) | 90 g. |
| Process Aid (e.g., from Example 1) | 10 g. |
| Tin Stabilizer (Thermolite 31) | 2 g. |
| Calcium stearate | 1.5 g. |
| TiO$_2$ | 2 g. |

The above components were thoroughly mixed in a beaker.

The test procedure involved activation of the mill and setting of the mill gap, temperatures and speeds as mentioned above. The compounding formula described above was poured onto the mill and a time clock was immediately activated. As soon as a continuous sheet of resin compound formed on the surface of the front roll, the time was noted. This is referred to as "band time". After the band time was noted a spatula was used to mix the resin in the mill for 120 seconds (including the band time). At this point the mixing by hand was stopped and the mill was allowed to continue the mixing until the compound stayed between the two rolls, began to melt and to flow freely. The time was noted and after the subtraction of 120 seconds, a time value was obtained which represented the "bank time". This is a very important measure of the resin's processability. A short bank time is desired for processing aids for calendering operations.

The process aid formed in Example 1 was tested against the process aid described in copending U.S. Ser. No. 388,288, filed Aug. 14, 1973, which utilizes a chain transfer agent and which is labelled 37 "Comparative Formulation" in the Table given below. The physical data is given for each of the process aids and the band and bank times obtainable therewith:

PROCESS AID

| | Example 1 | Comparative Formulation |
| --- | --- | --- |
| Relative Viscosity | 3.9 | 2.5 |
| % Acrylate (by weight) in Resin | 34.8 | 30 |
| Particle Size Not Passing the following Mesh Screens: | | |
| 40 | 0.6 | 0.4 |
| 60 | 6.3 | 13.0 |
| 80 | 4.7 | 26.0 |
| 100 | 3.9 | 17.0 |
| 140 | 21.1 | 32.0 |
| 200 | 41.1 | 10.0 |
| in Pans | 23.5 | 2.0 |
| Bulk Density (gr/cc) | 0.46 | 0.49 |
| Band time (sec.) | 14 | 16 |
| Bank time (sec.) | 14 | 74 |
| Film thickness (mils) | 9 | 9 |

What is claimed is:

1. A process for the preparation of a polyacrylate modified polyvinyl chloride processing aid in the absence of a chain transfer agent which comprises: (1) first preparing particles comprising polyvinyl chloride, by suspension polymerizing a monomer charge comprising vinyl chlorides in the presence of a suspending agent with agitation being applied to the system; (2) adding to the suspension of polyvinyl chloride containing particles produced in step (1) when the percent conversion of the monomer to polyvinyl chloride is in the range of 60–80 percent, (a) an acrylate ester monomer mixture comprising methyl methacrylate and ethyl acrylate, and (b) an effective concentration of at least one free radical initiating catalyst which is soluble in said acrylate ester monomer mixture to form a copolymer from the residual vinyl chloride monomer and the acrylate monomers; (3) adding an additional quantity of the acrylate ester monomer mixture to the mixture while agitating the mixture in the presence of catalyst to form a graft polymer between the copolymer and the additional acrylate monomers and; (4) recovering the particles of polyacrylate-modified polyvinyl chloride resulting from step (3).

2. A process as claimed in claim 1 wherein the amount of acrylate mixture that is added in step (2) ranges from about 4 to 6 parts with the amount of vinyl chloride containing monomer charge representing 100 parts.

3. The process as claimed in claim 1 wherein the acrylate mixture contains a weight ratio of from 4:1 to 6:1 methyl methacrylate to ethyl acrylate.

4. A process as claimed in claim 3 wherein the weight ratio is 5:1.

5. A process as claimed in claim 1 wherein the amount of acrylate mixture that is added in step (3) ranges from about 40–50 parts with the amount of vinyl chloride monomer representing 100 parts.

6. A process as claimed in claim 5 wherein the amount of mixture that is added is 45 parts per hundred.

7. A process as claimed in cclaim 1 wherein the acrylate mixture added in step (3) has a weight ratio of from 4:1 to 6:1 methyl methacrylate:ethyl acrylate.

8. A process as claimed in claim 7 wherein the weight ratio is 5:1

9. A polyacrylate modified polyvinyl chloride processing aid which comprises:
  a. a copolymer comprising about 100 parts by weight vinyl chloride copolymerized with from about 4 to 6 parts by weight of an acrylate mixture of methyl methacrylate and ethyl acrylate; and
  b. about 40 to 50 parts by weight, based upon the weight of the copolymer, of an acrylate mixture of methyl methacrylate and ethyl acrylate grafted onto said copolymer.

10. A processing aid as claimed in claim 9 wherein the acrylate mixture comprises from 4:1 to 6:1 parts by weight of methyl methacrylate:ethyl acrylate.

11. A processing aid as claimed in claim 10 wherein the acrylate mixture comprises about 5:1 parts by weight of methyl methacrylate:ethyl acrylate.

12. A processing aid as claimed in claim 9 wherein the acrylate mixture contains up to 10 percent by weight of an ethylenically unsaturated monomer which is coplymerizable with the acrylate mixture.

13. A processing aid as claimed in claim 9 wherein the amount of acrylate contained therein varies from about 30 percent to 40 percent by weight.

14. A processing aid as claimed in claim 9 wherein the amount of polyvinyl chloride contained therein varies between 60 percent and 70 percent by weight.

15. A processing aid as claimed in claim 9 wherein the amount of acrylate is about 45 percent by weight and the amount of polyvinyl chloride is about 65 percent.

16. A processing aid as claimed in claim 9 wherein the particle size is such that the minimum particle size is about 10 microns and no more than about 15 percent, by weight, are larger than about 150 microns.

17. A processing aid as claimed in claim 9 wherein the particle size ranges between 40 and 150 microns.

18. A processing aid as claimed in claim 9 wherein the vinyl chloride in the copolymer comprises up to 20 percent by weight of an ethylenically unsaturated monomer coplymerizable with the vinyl.

19. A polyvinyl chloride resin composition comprising a major proportion of polyvinyl chloride and from about 1 to 10 percent by weight of the composition ofthe process aid claimed in claim 9.

* * * * *

UNITED STATES PATENT AND TRADEMARK OFFICE
CERTIFICATE OF CORRECTION

PATENT NO. : 3,903,198
DATED : September 2, 1975
INVENTOR(S) : Chung H. Wei

It is certified that error appears in the above-identified patent and that said Letters Patent are hereby corrected as shown below:

Col. 2, line 13, "propertion" should be -- proportion --;

Col. 3, line 6, "$C_{12}$" should be -- $C_3$-$C_{12}$ --;

Col. 5, line 32, "sterate" should be -- stearate --;

Col. 5, line 40, "c$_1$" should be -- $C_1$ --;

Col. 5, line 41, "a" before "aconitic" should be -- as --;

Col. 6, line 62, "moded" should be -- molded --;

Col. 8, line 14, "37" after "labelled" should be deleted;

Col. 9, Claim 7, line 1, "cclaim" should be -- claim --;

Col. 10, Claim 15, line 2, "45" should be -- 35 --;

Col. 10, Claim 19, line 4, "ofthe" should be -- of the --.

Signed and Sealed this sixteenth Day of December 1975

[SEAL]

Attest:

RUTH C. MASON
*Attesting Officer*

C. MARSHALL DANN
*Commissioner of Patents and Trademarks*